(12) United States Patent
Turukhin et al.

(10) Patent No.: US 7,925,158 B2
(45) Date of Patent: Apr. 12, 2011

(54) TESTING OPTICALLY AMPLIFIED LINKS WITH TIME-DIVISION MULTIPLEXED TEST SIGNALS

(75) Inventors: Alexey Turukhin, Monmouth Junction, NJ (US); Enrico Gonzales, Toms River, NJ (US)

(73) Assignee: Acterna LLC, Germantown, MD (US)

( * ) Notice: Subject to any disclaimer, the term of this patent is extended or adjusted under 35 U.S.C. 154(b) by 788 days.

(21) Appl. No.: 11/866,575

(22) Filed: Oct. 3, 2007

(65) Prior Publication Data

US 2008/0085115 A1 Apr. 10, 2008

Related U.S. Application Data

(60) Provisional application No. 60/828,484, filed on Oct. 6, 2006.

(51) Int. Cl.
*H04B 10/08* (2006.01)
(52) U.S. Cl. ............... 398/35; 398/34; 398/32; 398/25; 398/16
(58) Field of Classification Search .................. 398/34, 398/35, 25, 32, 16
See application file for complete search history.

(56) References Cited

U.S. PATENT DOCUMENTS

| 4,858,224 | A * | 8/1989 | Nakano et al. ............... 370/217 |
| 6,480,318 | B2 * | 11/2002 | Mori et al. .................... 359/264 |
| 6,542,233 | B1 * | 4/2003 | Bray et al. .................... 356/324 |
| 6,999,177 | B2 * | 2/2006 | Muro et al. ................... 356/477 |
| 7,711,266 | B1 * | 5/2010 | Harris .............................. 398/25 |
| 7,787,765 | B2 * | 8/2010 | DeCusatis et al. ................ 398/8 |
| 7,826,745 | B2 * | 11/2010 | DeCusatis et al. ............. 398/75 |
| 2001/0028460 | A1 * | 10/2001 | Maris et al. ................... 356/432 |
| 2004/0028089 | A1 * | 2/2004 | Shake et al. .................. 370/542 |
| 2004/0165888 | A1 | 8/2004 | Gerstel et al. ................... 398/45 |
| 2006/0188256 | A1 * | 8/2006 | Hall et al. ....................... 398/45 |

FOREIGN PATENT DOCUMENTS

| EP | 1137213 | 9/2001 |
| JP | 61 166235 | 7/1986 |

* cited by examiner

*Primary Examiner* — Ken N Vanderpuye
*Assistant Examiner* — Hibret A Woldekidan
(74) *Attorney, Agent, or Firm* — Matthew A. Pequignot; Pequignot + Myers LLC

(57) ABSTRACT

A time division multiplexed measurement technique is used for spectral measurements in active wavelength division multiplexed loaded optical links, and offers instantaneous real-time correlation of performance and spectral parameters of the link, which is important for dynamic characterization of link performance during transient effects or polarization mode dispersion fluctuations.

8 Claims, 6 Drawing Sheets

TESTING OPTICALLY AMPLIFIED LINKS WITH TIME-DIVISION MULTIPLEXED TEST SIGNALS

CROSS-REFERENCE TO RELATED APPLICATIONS

The present invention claims priority from U.S. Patent Application No. 60/828,484 filed Oct. 6, 2006, which is incorporated herein by reference.

TECHNICAL FIELD

The present invention relates to the testing of optically amplified links, and in particular to the testing of loaded wavelength division multiplexed links with time division multiplexed test signals.

BACKGROUND OF THE INVENTION

The performance of optical transmission links is largely determined by the spectral properties of the transmission fiber, the optical amplifiers, the reconfigurable optical add/drop multiplexers (ROADMs), and various other components included in the links. Spectral characterization of assembled and installed transmission links are extremely important for link performance optimization, troubleshooting, and maintenance. Modern wavelength division multiplexed (WDM) networks offer many challenges for test and measurement equipment, in particular to conducting spectral measurements in active WDM links in which optical amplifiers are designed to carry many WDM channels. Currently, spectral measurements in active WDM links are either measured unloaded, i.e. without WDM channels, or loaded, i.e. with WDM channels.

The unloaded approach is not suitable for measurement techniques, such as a differential phase shift (DPS) method, based on a single scanning channel, i.e. a probe channel. To avoid nonlinear impairments in transmitted signals, the total output power of a typical optical amplifier, which is normally shared among 40 or 80 WDM channels, is constant and usually is limited to about +20 dBm, i.e. about +4 dBm per channel for 40 channel system. Accordingly, attempts to measure spectral properties with a single channel will lead to heavy nonlinear impairments, e.g. stimulated Brillouin scattering (SBS) and self phase modulation (SPM), in the probe channel, which make the probe channel virtually undetectable. Measurement techniques based on broad band sources (BBS), similar to the fixed analyzer method for PMD measurements, have worked well with WDM amplifiers; however, in the absence of WDM channels, amplifier noise might significantly reduce the degree of polarization of the original BBS and jeopardize the accuracy of such measurements. Also, BBS methods are applicable only to spectrally averaged types of measurements.

The loaded approach requires frequency demultiplexing of a probe signal with the WDM channels, which is commonly done with an interleaver at the output of the link. The interleaver is used to block the WDM channels from entering an analyzer and disturbing the test measurements. Unfortunately, spectral intervals, adjacent to the WDM channels on the ITU grid, are simply eliminated from the measurements by the interleaver, whereby important spectral information is lost.

Moreover, both traditional approaches are disruptive for data traffic in the transmission link under test; therefore, they cannot be used for real time correlation between performance and spectral parameters of the link channels, which is important when link parameters are changing, e.g. PMD fluctuations.

An object of the present invention is to overcome the shortcomings of the prior art by providing a testing system for use in an active WDM optical link providing a variety of spectral measurements under normal operating conditions of the fiber link.

SUMMARY OF THE INVENTION

Accordingly, the present invention relates to a system for testing an optical link, while a wavelength division multiplexed (WDM) signal with a plurality of wavelength channels is being transmitted, comprising:
a probe signal generator for generating a probe signal;
a first time division multiplexing (TDM) optical switch for time division multiplexing the probe signal with the WDM signal forming a TDM signal;
a second TDM optical switch for separating the probe signal from the WDM signal after the TDM signal has traversed the optical link; and
an analyzer for receiving the probe signal from the second TDM switch, and for conducting tests on the probe signal.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
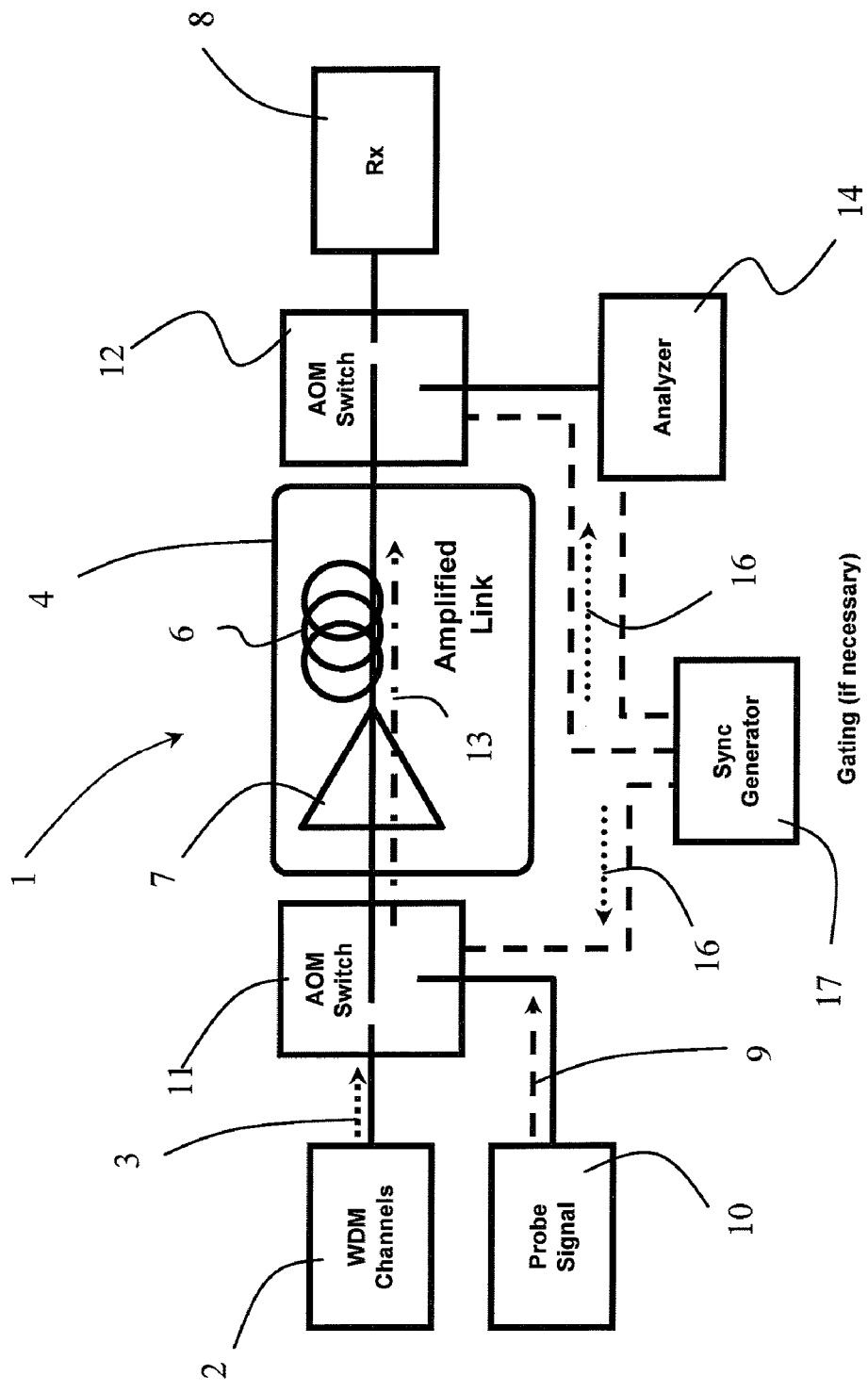
FIG. 1 illustrates a schematic representation of an optical link with a test system in accordance with the present invention.

With reference to FIG. 1, a typical optical network, generally indicated at 1, includes a front end 2 with one or a plurality of transmitters for generating one or more optical signals on WDM wavelength channels, each defined by a unique center wavelength, e.g. in the C band between 1520 nm and 1550 nm, and a wavelength division multiplexer for multiplexing the WDM wavelength channels together into a multiplexed wavelength signal 3. The multiplexed wavelength signal 3 is transmitted over a typical amplified optical link 4, which includes a length of optical fiber 6 and one or more amplifiers 7, e.g. erbium doped fiber amplifiers (EDFA), for each predetermined length of the optical fiber 6. Switches, add/drop multiplexers and other optical components can also be provided in the amplified optical link 4. At the receiver end 8, optical photo-detectors are provided for converting the optical signals back into electrical signals.

In accordance with the present invention, a probe signal 9 is generated by probe signal generator 10, and time division multiplexed (TDM) with the WDM wavelength channel signal 3 prior to being transmitted over the amplified optical link 4, i.e. the link under test. A variety of test signals can be used for the probe signal, e.g. the probe signal generator 10 can be a tunable modulated laser for differential phase shift type measurements or a broad band source for fixed analyzer PMD measurements. The probe signal 9 must not exceed the maximum optical power threshold for the fiber link 6, and must be spectrally positioned within the operating frequency range of the fiber link, e.g. the C-band between 1520 and 1560 nm and or the L-band between 1560 nm and 1610 nm. To perform TDM, a first high frequency 2×1 TDM optical switch 11, e.g. an acousto-optical (AOM) switch, is positioned at the input of the link under test 4, and a second high frequency 2×1 TDM optical switch 12, e.g. an acousto-optical (AOM) switch, is positioned at the output of the link under test 4. The first switch 11 forms a TDM signal 13 by multiplexing the WDM signal 3 and the probe signal 9 with a modulation frequency of about 1 MHz, which is high enough to be unnoticeable by the EDFA amplifiers 6, and low enough to avoid expensive high-speed switches that implement mux/demux operations along the optical link 4. The reaction time of an EDFA is defined by the relaxation time of the erbium ions and the speed of the gain control system, e.g. 10 to 100 µs, which is too slow to react to fast events, such as input signal modulation over 0.5 MHz, whereby operation of the EDFA amplifiers 7 will be determined by total average input power, assuring that the EDFA behaviour is not affected by the modulation, and enabling measurements to be conducted under the fiber link's operating conditions. In practice the modulation frequency can be selected between 0.5 MHz and 100 MHz depending on the type and mode of operation of the amplifiers 7, and the test and measurement (T&M) equipment selected for spectral measurements in probe signal analyzer 14. Practical ranges are 0.5 MHz to 10 MHz, 1.0 MHz to 10 MHz, 0.5 MHz to 5 MHz, and 1.0 MHz to 5 MHz; however, faster ranges, e.g. 2 to 100 MHz, 10 MHz and above, and 10 MHz to 100 MHz, are also advantageous. The second switch 12 demultiplexes the TDM signal 13 back into the separate WDM signal 3 and the probe signal 9 for transmission to the receiver end 8 and the analyzer 14, respectively.

While electronic gating at 1 MHz time scale would have been a problem for most T&M equipment, the 1 MHz frequency can be easily achieved by optical gating provided by the AOM switches 11 and 12, thereby enabling a reduction of the gating problem to the selection of appropriate time averaging constants in the probe signal analyzer 14. As a result of optical demultiplexing by the second switch 12, a pulsed optical probe signal 9 is sent to the signal analyzer 14. In fact, the typical range for time averaging constants for most T&M equipment is longer than milliseconds, so that the pulsed optical probe signal 9 will be averaged by the signal analyzer 14, whereby most T&M equipment can be used with TDM measurements technique in the analyzer 14 without any modification.

Preferably, gated detection of the WDM signals is provided to facilitate real time troubleshooting of transmission links, e.g. during PMD-induced outages. When gated detection is used, a 1 MHz electrical pulse 16 is generated by a pulse generator 17 to drive, i.e. set the modulation or clock frequency, the first acousto-optic modulator switch 11. The electrical pulse 16 from the pulse generator 17 is also used as a gating pulse, for driving the second acousto-optic modulator switch 12 at the receiver end, whereby the first and second switches 11 and 12 at the ends of optical link 4 are operated in synchronism. Accordingly, the gating pulse 16 can be used for gated detection, i.e. to switch the second switch 12, so that the probe signal 9 is directed to the analyzer 14 only when the probe signal 9 is present in the TDM signal 13, and so that the WDM signal 3 is directed to the receiver end 8 only when the WDM signal 3 is present in the TDM signal 13. Accordingly, the second AOM switch 12 is also acting like a time division demultiplexer, see FIG. 2.

Figure 3:
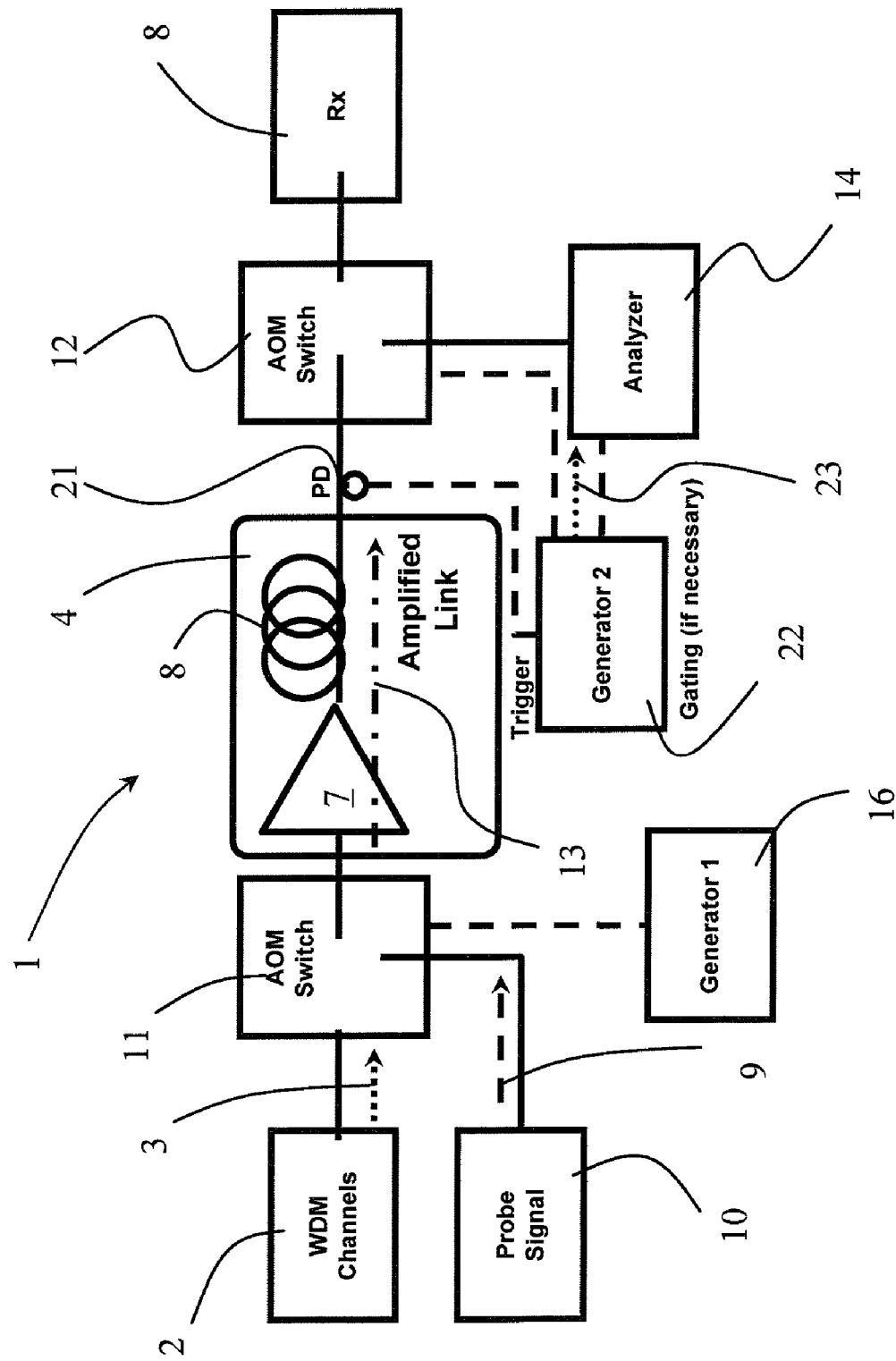
FIG. 3 illustrates a time diagram of the WDM and probe signals.

If practical, both the first and second AOM switches 11 and 12 are synchronized by a gating pulse generated by the same pulse generator 17, as shown in FIG. 1. However, an electrical gating pulse 16 is not absolutely necessary for the present invention to work. For measurements in long-haul links, when the input and the output of the optical link 4 physically cannot be connected to the same generator 17, an alternative embodiment, illustrated in FIG. 3, includes a photo-detector 21 positioned before the second AOM switch 12 to recover the clock frequency of the 1 MHz pulse modulation on the TDM signal 13, which is transmitted to a second pulse generator 22, independent of pulse generator 16. The second pulse generator 22 includes electronic circuitry for detecting edges of the pulses in the TDM signal 13 for generating a second electrical pulse 23, which is used to trigger the operation of the second AOM switch 12. Accordingly, it is not necessary to supply the electrical gating pulse 16 from the transmitter end 2 to the receiver end 8, which is difficult when the transmitter end 2 and the receiver end 8 are widely separated. Unfortunately, synchronization of the first and second AOM switches 11 and 12 is not possible if no light reaches the receiver end 8. However, if an electrical gating pulse 16 is supplied to the receiver end 8 from the transmitter end 2, the first and second AOM switches 11 and 12 will operate in synchronism even when no light reaches the receiver, which facilitates trouble shooting the optical link 4.

Electrical gating can be applied to a bit error rate test (BERT) to provide real time BER measurements, which then can be correlated with real time spectral measurements obtained by the spectral analyzer 14. Fundamentally, time resolution of correlation measurements is limited by the time constant in the spectral analyzer 14 and the error accumulation time required for statistically stable BER measurements, i.e. for a given time constant (averaging time), the spectral analyzer 14 cannot detect and correlate events that are faster (shorter) then this time constant. Therefore, time resolution down to a few dozens of seconds seems to be feasible. None of the currently available traditional measurement techniques can offer similar correlation measurements due to inherently sequential approach: performance measurements have to be done before or after spectral ones.

To verify the operational principle of the TDM technique according to the present invention, two experiments were conducted with a fully functional WDM amplified link. In both experiments, the optical link under test 4 contained nine optical amplifiers 7 and about 560-km of single mode fiber (SMF) 8 with a dispersion compensation map (DCM). The DCM has been optimized for 10 Gb/s NRZ zero-chirp transmission that resulted in about 7% of undocompensation. The optical link 4 was populated with the WDM signal 3 including forty wavelength channels with 100 GHz spacing across the C-band. Timing for the TDM measurements was established according to the diagram shown in FIG. 3. The modulation frequency of the first and second AOM switches 11 and 12 was set to 0.7 MHz (limited by available pulse generators) which is slightly lower than desirable switching frequency, so that insignificant reaction from the EDFA amplifiers 7 was expected. At the first AOM switch 11, the probe signal channel 9 from the probe signal generator 10 had about 7 dB higher peak power than average WDM channel in WDM signal 3.

Figure 4:
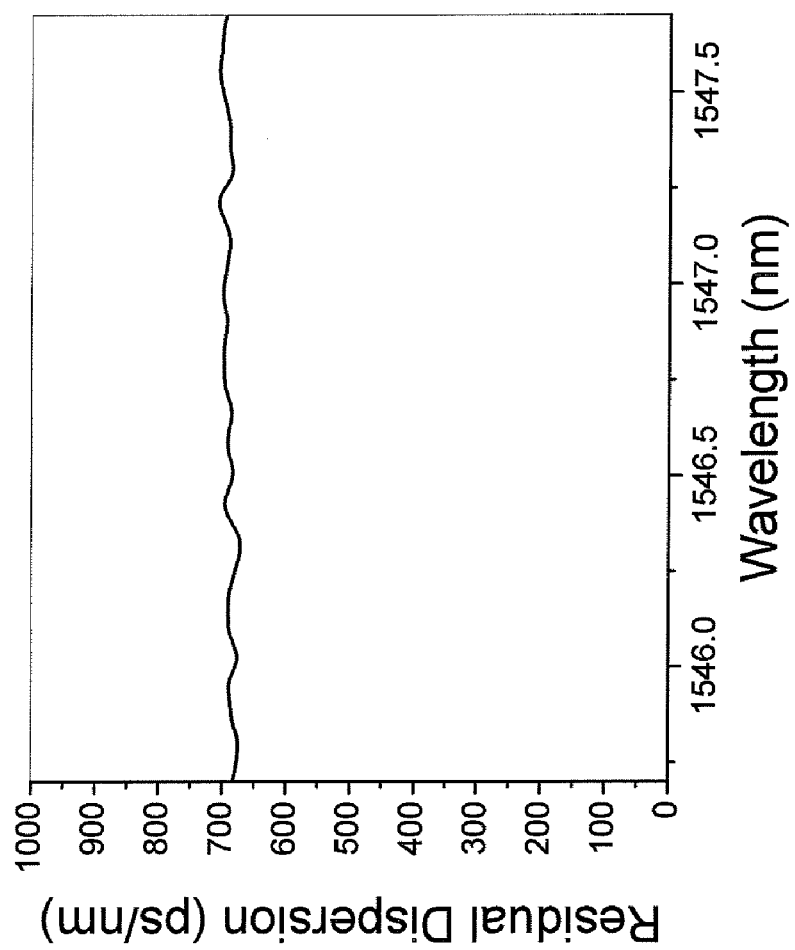
FIG. 4 is a plot of residual dispersion vs wavelength for a WDM populated and amplified link using the test system of FIG. 1 with a standard ODA based on a DPS method.

During the first experiment, a commercial optical dispersion analyzer (ODA) based on differential-phase shift method was used in the analyzer 14. Operation parameters or design of the ODA device were not adjusted or modified in any way. With TDM techniques in operation, the ODA was able to collect all required data, i.e. cumulative gain/insertion loss, group delay, PDL, DGD, etc., for the fully populated amplified link 4. FIG. 4 graphically illustrates a fragment of measured CD dependence, in which a measured average CD value of 700 ps/nm is in agreement with expected residual dispersion of the link calculated based on SMF and DCF specifications, and the used dispersion compensation map.

Figure 2:
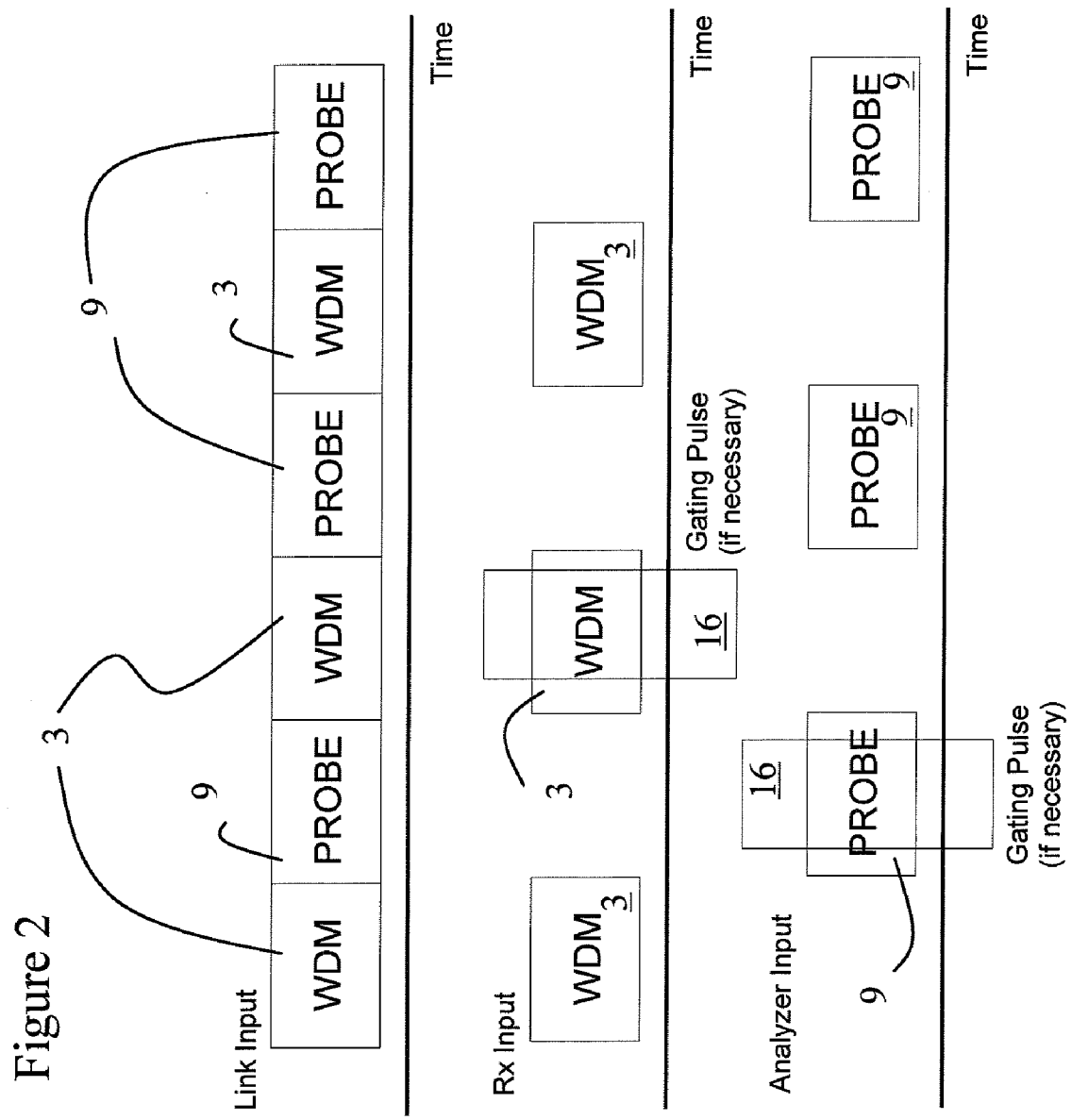
FIG. 2 illustrates a schematic representation of an optical link with an alternative embodiment of the test system in accordance with the present invention.
Figure 5:
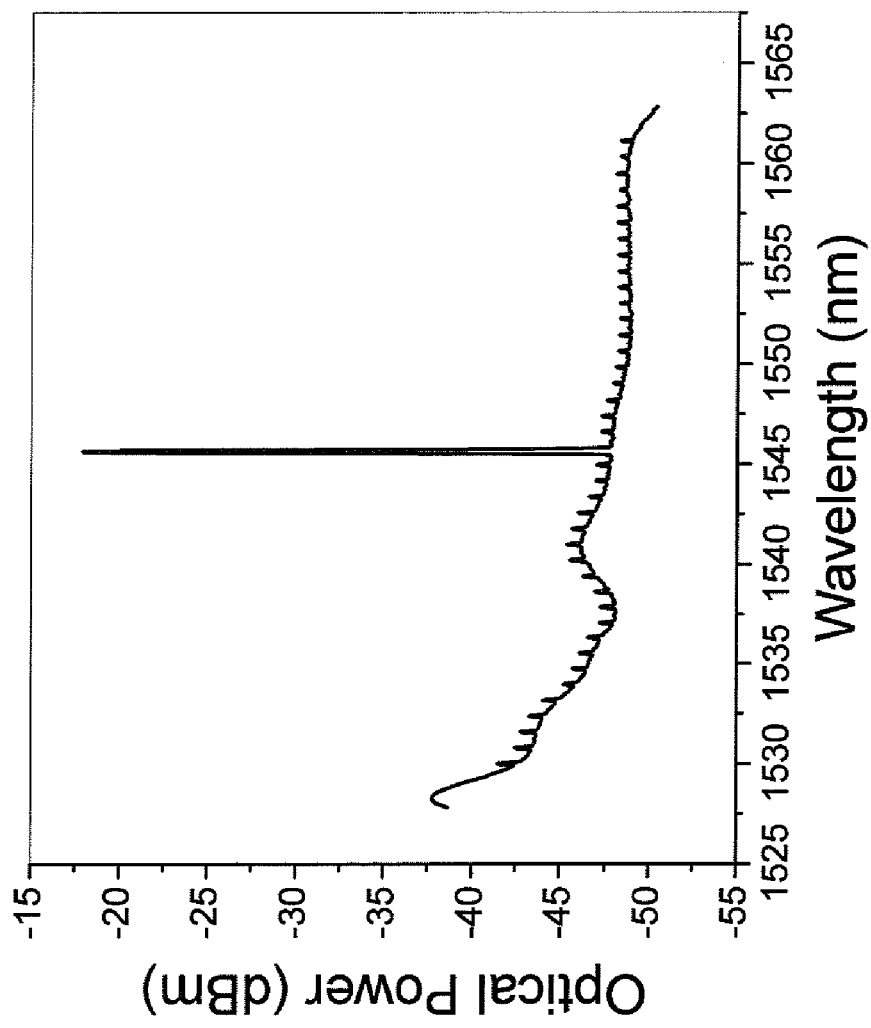
FIG. 5 is a plot of optical power vs wavelength of a probe signal from the test system of FIG. 1.
Figure 6:
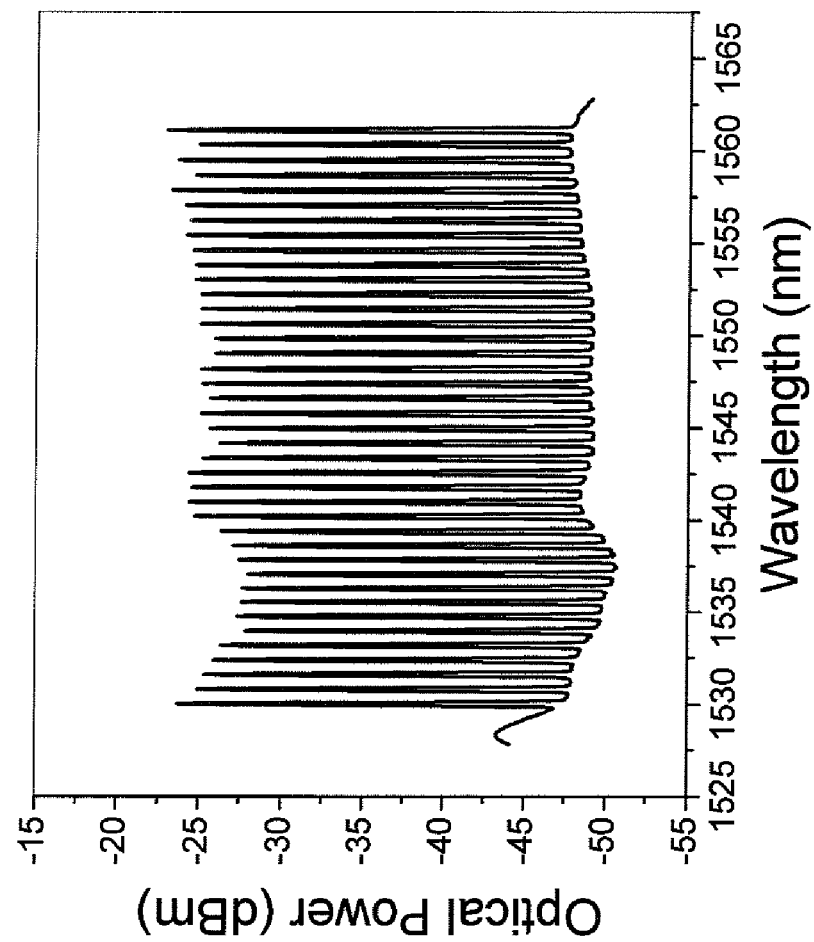
FIG. 6 is a plot of optical power vs wavelength of a WDM signal transmitted through the optical link under test.

In accordance with the present invention, an optical spectrum, taken by the ODA device in the analyzer 14 and illustrating the probe signal 9 at approximately 1545 nm, is presented in FIG. 5. The optical spectrum was taken with optical gating with a gate pulse set 16 for the probe signal 9, see FIG. 2, the lower diagram. The WDM channels in the WDM signal 3 are successfully suppressed by optical gating by the second AOM switch 12 in front of the analyzer 14. FIG. 6 illustrates a spectrum received with gating pulse "flipped" to the WDM signal 3, i.e. timing is similar to middle diagram of FIG. 2, showing the wavelength optical channels taken from a monitor output (−20 dB) of the last amplifier 7 in the optical link 4.

A comparison of the spectra in FIGS. 5 and 6 shows that the original power difference of 7 dB between the probe and the WDM channels 9 and 3, respectively, has been preserved during propagation through the link 4. Hence, due to time multiplexing, a single probe channel 9 is able to propagate in a link 4 without draining all the power from the WDM amplifiers 7 and to maintain its peak power well under the nonlinearity threshold. A tilt of the ASE baseline in the first spectrum, FIG. 5, can be explained by the low modulation frequency used for the first and second AOM switches 11 and 12, so that the optical amplifiers 7 have been slightly reacting to the modulation of the total input optical power from 0 dBm (WDM channels 3) to −10 dBm (ODA probe channel 9). With higher modulation frequency, it is possible to maintain the ASE at the same level that can be successfully used for OSNR measurements in amplified links.

For the second experiment, a JDSU T-BERD 8000® with a PMD module and a complimentary broad band source OBS-15a® and variable polarizer OVP-15® is used to measure average PMD in the amplified link 4. The average PMD value was found to be 1.45 ps, which is in reasonable agreement with the previous results. Again, the TDM measurement technique worked well without any modification or adjustment of standard T&M equipment in analyzer 14.

We claim:

1. A system for testing an optical link, while a wavelength division multiplexed (WDM) signal with a plurality of wavelength channels is being transmitted, comprising:
   a probe signal generator for generating a probe signal;
   a first time division multiplexing (TDM) optical switch for time division multiplexing the probe signal with the WDM signal forming a TDM signal;
   a second TDM optical switch for separating the probe signal from the WDM signal after the TDM signal has traversed the optical link;
   an analyzer for receiving the probe signal from the second TDM switch, and for conducting tests on the probe signal;
   a gating signal generator connected to the second TDM switch for generating a gating signal indicative of a modulation frequency of the TDM signal for use in separating the probe signal from the WDM signal;
   a photo-detector connected to the gating signal generator for detecting the modulation frequency of the TDM signal;
   and a clock signal generator, independent of the gating signal generator, connected to the first TDM optical switch for generating a clock signal to set the modulation frequency of the TDM signal.

2. The system according to claim 1, wherein the first TDM switch has a modulation frequency of between 0.5 MHz and 100 MHz.

3. The system according to claim 1, wherein the first TDM switch has a modulation frequency of about 1 MHz to 10 MHz.

4. The system according to claim 1, wherein the probe signal generator comprises a tunable modulated laser for generating probe signals defined by different center wavelengths.

5. The system according to claim 4, wherein the probe signal is tuneable to a wavelength between 1520 nm and 1610 nm.

6. The system according to claim 1, wherein each of the first and second TDM switches comprises an acousto-optic modulator switch.

7. The system according to claim 1, wherein the probe signal generator comprises a broad band source.

8. The system according to claim 7, wherein the probe signal is covers a wavelength range from 1520 nm to 1560 nm and/or 1560 to 1610.

\* \* \* \* \*